(12) United States Patent
Herrmann et al.

(10) Patent No.: US 11,112,966 B2
(45) Date of Patent: Sep. 7, 2021

(54) TOUCHSCREEN DISPLAY INCLUDING REPOSITIONABLE VIRTUAL INPUT

(71) Applicant: Xerox Corporation, Norwalk, CT (US)

(72) Inventors: Douglas K. Herrmann, Webster, NY (US); Erwin Ruiz, Rochester, NY (US); Kirk V. Pothos, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/516,206

(22) Filed: Jul. 18, 2019

(65) Prior Publication Data

US 2021/0019044 A1 Jan. 21, 2021

(51) Int. Cl.
| | |
|---|---|
| *G06F 3/0488* | (2013.01) |
| *G06F 3/0484* | (2013.01) |
| *G06F 3/041* | (2006.01) |
| *G06F 3/0482* | (2013.01) |

(52) U.S. Cl.
CPC ...... *G06F 3/04886* (2013.01); *G06F 3/04186* (2019.05); *G06F 3/04845* (2013.01); *G06F 3/0482* (2013.01)

(58) Field of Classification Search
CPC .. G06F 3/04886; H01Q 5/335; H01Q 13/106; H01Q 1/38; H01Q 21/28; H01Q 1/2291; H01Q 1/243
See application file for complete search history.

(56) References Cited

U.S. PATENT DOCUMENTS

| | | |
|---|---|---|
| 6,977,646 B1 | 12/2005 | Hauck et al. |
| 2006/0293864 A1 | 12/2006 | Soss |
| 2007/0091078 A1 | 4/2007 | Park et al. |
| 2008/0231604 A1* | 9/2008 | Peterson ............. G06F 3/04886 |
| | | 345/173 |

OTHER PUBLICATIONS

Background of the Invention Xerox U.S. Appl. No. 16/516,206; (Year: Aug. 2018) (Year: Aug. 2019).*

* cited by examiner

*Primary Examiner* — Cao H Nguyen
(74) *Attorney, Agent, or Firm* — Simpson & Simpson, PLLC

(57) ABSTRACT

A touchscreen display having a repositionable virtual input and a method therefor are disclosed. The touchscreen display includes an electronic display displaying a virtual input. The touchscreen display maintains electric communication with a central processing unit (CPU) and a non-transitory computer readable storage medium that stores data corresponding to the touchscreen display. The virtual input is repositionable from a first display position to a second display position based on the virtual input at the first display position satisfying one or more of a number of input attempts, a number of successful input attempts, and a number of failed input attempts satisfying predetermined criteria. When one of the number of input attempts, the number of successful input attempts, and the number of failed input attempts do not satisfy the predetermined criteria, the virtual input can maintain a display position at the first display position.

24 Claims, 12 Drawing Sheets

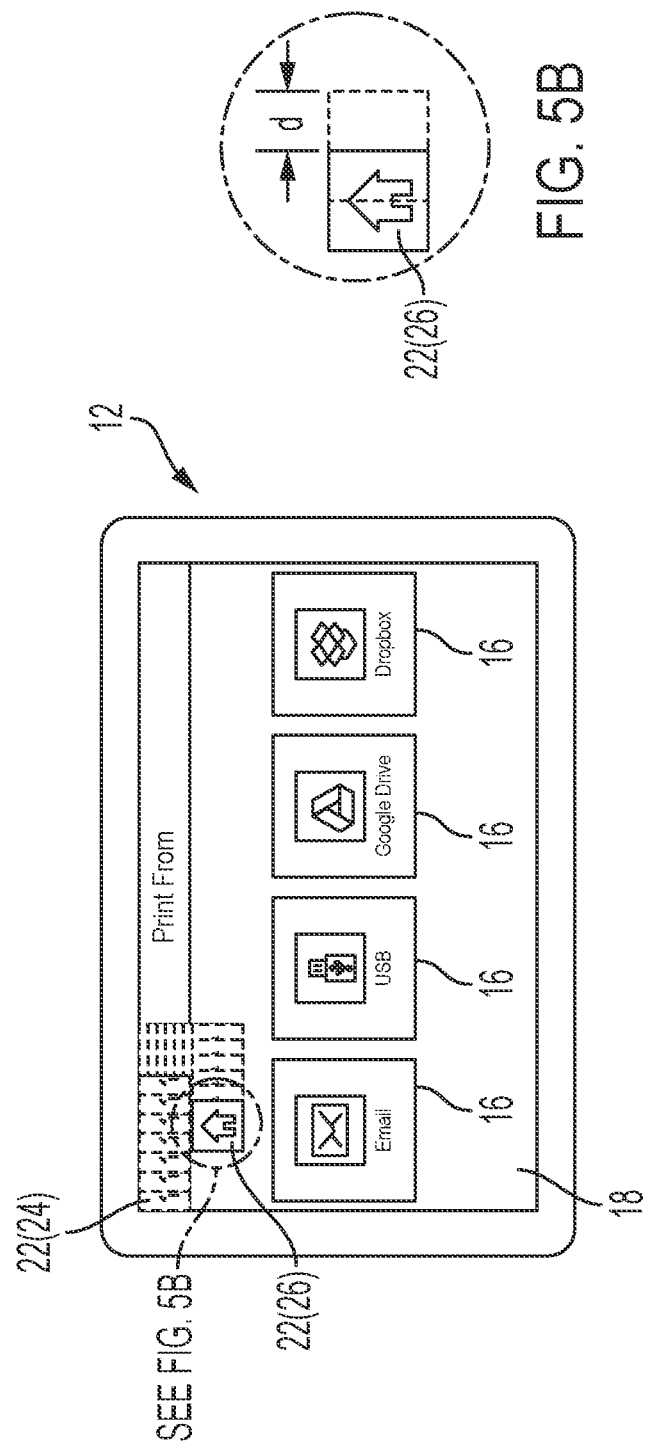

TOUCHSCREEN DISPLAY INCLUDING REPOSITIONABLE VIRTUAL INPUT

BACKGROUND

A variety of electronic devices, such as cellphones, laptop computers, and electronic kiosk terminals, include touchscreen displays for displaying and inputting information to a computer or processor connected thereto. As with most electronic devices including touchscreen displays, the touchscreen display is formed from a transparent glass or plastic laminate structure that allows for the display of a software input button/field, or a virtual input, which when "touched" by a user, undertakes the desired input or action designated by the user and corresponding to the virtual input. As a result of the use of touchscreen displays, peripheral devices such as keyboards, computer mice, or so-called physical hard-keyed input buttons can usually be dispensed with. Nowadays, it is not uncommon for individuals to interact with a touchscreen display on at least a daily basis either via their smart phone device, a laptop computer, a computer tablet, or an electronic kiosk terminal, etc.

While there are a number of different types of touchscreen displays employing different technologies to operate, e.g., resistive, capacitive, IR, and surface acoustic wave, etc., most touchscreen displays employ either the resistive or the capacitive technologies, each of which have their particular advantages and disadvantages. With regard to resistive-type touchscreen displays, such displays typically comprise a pair of transparent electrically resistive layers that face each other to form a thin gap therebetween. When an object, such as a fingertip or a stylus, presses down on the surface of the touchscreen, the two resistive layers meet at the point at which the pressure was applied. From that, the position of the pressure can be determined and a desired input performed based on the virtual input associated with the position. Resistive touchscreens are generally considered to be low cost and have a higher tolerance for contaminants such as liquids, but do not provide as clear a picture. Additionally, while resistive type touchscreens can be used with a stylus or other implement for inputting an operation, pressure must be applied in order to operate the touchscreens and this often leads to early damage. With regard to capacitive-type touchscreen displays, such displays typically include a transparent insulator, such as a transparent glass or plastic coverscreen, a transparent adhesive, and one or more transparent conductors forming a grid pattern, e.g. Indium Tin Oxide (ITO) conductive layer(s). When a small voltage is applied to the conductive layer(s), a uniform electrostatic field is created. Thereafter, when a conductor, such as a human finger, touches the surface of the glass or plastic coverscreen, a distortion of the electrostatic field occurs at that position, and the position that the screen was touched can be determined. Based on the determined position and the virtual input associated therewith, a desired input can then be performed. Unlike the resistive-type touchscreens that operate via an applied pressure that bridges the thin gap between the two resistive layers, capacitive-type touchscreens do not require that a significant pressure be applied in order to provide an input. However, with capacitive-type touchscreens, an input must typically be performed with an ungloved, or thinly gloved, finger or via the use of a specialized capacitive stylus.

While capacitive-type touchscreens do not typically require the application of significant pressures in order to provide an input via a virtual input, users necessarily must touch or "tap" the screen to provide an input, which invariably results in a pressure being applied to the touchscreen display. While the application of pressure is not typically problematic for touchscreen displays having little "flex," e.g., smaller area touchscreens or touchscreens having thicker glass or plastic coverscreens, it can be problematic for touchscreens having more "flex," e.g., larger area touchscreens or touchscreens having thinner transparent coverscreens, e.g. often less than 1 mm in thickness. That is, when a pressure is applied to input an operation corresponding to a particular virtual input on touchscreens having more "flex," over a long period of time and/or when a particular virtual input is repeatedly pressed over and over to perform a specific repetitive operation, e.g., pressing an "Enter" or "Home" button, such repeated action on the more flexible touchscreens can result in delamination of the touchscreen and the degradation of the ITO conductive layer(s) at the location of the particular virtual input. When this occurs, the operation of the touchscreen display is usually negatively affected in that the particular virtual input may not be as responsive as in the past and/or or the virtual input may now require the application of additional pressure or "taps" to input a specific operation. Naturally, the application of additional pressure or "taps" typically accelerates further damage to the ITO layer and the particular virtual input is soon rendered inoperable. When a particular virtual input on a touchscreen begins to malfunction and/or is rendered inoperable as a result of its repeated use or premature wear, despite the fact that other areas of the touchscreen display remain fully operable and in good working order, the touchscreen as a whole, nonetheless, must be replaced. This often occurs at high cost in terms of equipment and manpower.

While solutions attempting to address the above described problems have included the use of movable virtual input buttons or signature fields on touchscreen displays to extend their useful lifespans, such solutions have been limited in terms of user friendliness, options, an awareness of factors leading to the degradation of the touchscreen displays, and/or have not applied certain parameters in determining whether a touchscreen display remains in an acceptably operable state or is in need of replacement. For example, U.S. Pat App. Pub. No. 2008/0231604 (Peterson) describes a method for extending the lifespan of a touchscreen display by relocating a virtual signature area and a virtual keypad from one area of the touchscreen display to another area, however such methods primarily rely upon mere frequency data and/or do not set forth, with specificity, means or methods by which operability may be assessed or determined, and/or certain means and methods by which a virtual input may be relocated on a touchscreen display.

What is needed, then, is an improved touchscreen display that reduces the incidence of premature wear of a region of a touchscreen display corresponding to one or more virtual input buttons, which extends the operable life of the touchscreen display as a whole, which is more user friendly, and which utilizes heretofore unconsidered factors to apply certain parameters for purposes of determining whether a touchscreen display remains in an acceptably operable state, or is in need of replacement.

SUMMARY

The subject matter of the instant disclosure generally relates to electronic touchscreen displays of the types used, for example, in association with mobile devices, computer tablets, laptop computers, electronic kiosks and the like, which both display information and allow users to input operations or information via the touchscreen display upon the user making contact therewith, for example, with their finger or with a stylus, without the need to utilize accessories such as a physical keyboard or a computer mouse.

According to aspects set forth herein, there is provided a touchscreen display including a transparent coverscreen, a conductive layer capable of communicating an electric signal (e.g. an ITO layer), and an electronic display displaying a virtual input. The touchscreen display is in electric communication with a central processing unit (CPU) and a non-transitory computer readable storage medium that stores computer readable instructions for operating the touchscreen display. The non-transitional storage medium, or another separate non-transitional storage medium, can store data corresponding to and/or obtained from the touchscreen display. The virtual input is repositionable from a first display position on the touchscreen display to a second display position on the touchscreen display based on the virtual input at the first display position satisfying one or more of: a number of attempted inputs satisfying predetermined criteria, a number of successful inputs satisfying predetermined criteria, and a number of failed input attempts satisfying predetermined criteria. Where one of the number of attempted inputs, the number of accepted inputs, and/or the number of failed input attempts at the first display position do not satisfy any of the predetermined criteria, the virtual input may maintain a display position at the first display position.

According to some aspects, the virtual input is incrementally repositionable from the first display position to the second display position within a predefined proportional distance.

According to aspects, the virtual input is incrementally repositionable from the first display position to the second display position such that the second display position partially overlaps with the first display position.

According to some further aspects, the virtual input is incrementally repositionable from the first display position to the second display position such that the virtual input is maintained within a predefined region of the touchscreen display.

According to some particular aspects, the virtual input is successively incrementally repositionable from the first display position to an $n^{th}$ display position within a first predefined region of the touchscreen display, and when the virtual input satisfies predetermined criteria at the $n^{th}$ display position within the first predefined region, the virtual input is repositionable to a second predefined region of the touchscreen display.

According to some aspects, the virtual input is automatically incrementally repositionable from the first display position to the second display position, and according to some aspects the virtual input is manually repositionable from the first display position to the second display position.

According to some further aspects, when the data, e.g., operational and/or use data, satisfies predetermined criteria, an indicator is displayed on the touchscreen display to indicate that the virtual input is to be repositioned from the first display position to the second display position. According to some aspects, the indicator comprises at least one of a message output to the touchscreen display, a change in a shade of the virtual input, or a change in color of the virtual input.

According to some aspects, when an input of the virtual input is maintained for a predetermined period of time, data pertaining to the virtual input at its current position is displayed to the touchscreen display.

According to, still yet, some aspects, the virtual input is manually repositionable from the first display position to the second display position, and when input of the virtual input is maintained for a predetermined period of time, one or more positions to which the virtual input may be repositioned to constitute the second display position are displayed, and one or more positions to which the virtual input may not be repositioned to constitute the second display position are displayed. According to some aspects, the one or more positions to which the virtual input may be repositioned are displayed in a first color and the one or more positions to which the virtual input may not be repositioned are displayed in a second color different from the first color.

According to some aspects, the virtual input is repositionable from the first display position to an $n^{th}$ display position, which $n^{th}$ display position is dissimilar to a former display position of the virtual input.

According to some further aspects, the virtual input is repositionable from the first display position to the second display position based on one or more of: a preset time period, a time of day, a time of week, a time of month, a time of year, a temperature, and humidity. According to some aspects, a frequency of the repositioning of the virtual input from the first display position to the second display position is based on one or more of a time of day, a time of week, a time of month, a time of year, a temperature, and humidity.

According to some additional aspects, the virtual input is repositionable from the first display position to the second display position based on a measured change in a resting voltage, a resting capacitance, or a resting resistance of a portion of the conductive layer relative to a previously obtained resting voltage, resting capacitance, or resting resistance of the portion of the conductive layer.

According to some aspects, the virtual input is repositionable from the first display position to an $n^{th}$ display position, which $n^{th}$ position is dissimilar to a former display position of the virtual input, and wherein when is it determined that no further $n^{th}$ display positions are available to which to reposition the virtual input, a signal is transmitted by the CPU indicative of the determination.

According to some aspects, the virtual input is repositionable from the first display position to the second display position based on the number of failed input attempts occurring within a predetermined time period.

According to some particular aspects, when the measured change in the resting voltage, the resting capacitance, or the resting resistance of the portion of the conductive layer satisfies predetermined criteria and is indicative of degradation of the portion of the conductive layer associated with the first display position, the virtual input is repositionable from the first display position to the second display position, which second display position is not associated with the degraded portion of the conductive layer, or another degraded portion of the conductive layer.

According to aspects set forth herein, there is provided a method of repositioning a virtual input on a touchscreen display from a first display position to a second display position. The touchscreen display is in electric communication with a central processing unit (CPU) and a non-transitory computer readable storage medium that stores instructions for operating the touchscreen display. The non-transitory computer readable storage medium, or another non-transitory computer readable storage medium, also receives and stores data corresponding to the touchscreen display, e.g., operational and use data. According to aspects of the method, the CPU receives data corresponding to an input attempt of the virtual input at the first display position, determines whether the input attempt at the first display position was a successful input attempt or a failed input attempt, stores a number of input attempts, a number of successful input attempts, and a number of failed input attempts of the virtual input at the first display position in the non-transitory computer readable storage medium, and determines whether one of the number of input attempts, the number of successful input attempts, and/or the number of failed input attempts of the virtual input at the first display position satisfy predetermined criteria. When one of the number of input attempts, the number of successful input attempts, and the number of failed input attempts of the virtual input at the first display position do not satisfy the predetermined criteria, the virtual input is allowed to maintain a display position at the first display position. When one of the number of input attempts, the number of successful input attempts, and the number of failed input attempts of the virtual input at the first display position satisfy the predetermined criteria, the virtual input is allowed to be repositioned to the second display position different from the first position.

According to some aspects of the method, repositioning of the virtual input from the first display position to the second display position is performed automatically by the CPU, or the CPU allows the repositioning to be performed manually.

According to some additional aspects of the method, when the virtual input is automatically repositioned, it is incrementally repositioned from the first display position to the second display position such that the second display position partially overlaps the first display position.

According to some further aspects of the method, when the virtual input is manually repositioned, the CPU displays to the touchscreen one or more positions to which the virtual input may be repositioned to constitute the second display position in a first color and one or more positions to which the virtual input may not be repositioned to constitute the second display position in a second color different from the first color.

According to some aspects of the method, when input of the virtual input is maintained for a predetermined time period, data corresponding to the current display position of the virtual input is displayed.

According to some further aspects of the method, when the virtual input is automatically repositioned, it is successively incrementally repositionable from the first display position to an $n^{th}$ display position within a first predefined region of the touchscreen display, and when the virtual input satisfies predetermined criteria at the $n^{th}$ display position within the first predefined region, the virtual input is repositionable to a second predefined region of the touchscreen display.

According to some aspects of the method, the CPU is configured to receive electronic signals from an electrically conductive layer of the touchscreen display corresponding to one or more of a resting voltage, a resting capacitance, or a resting resistance of the conductive layer. When a change in the resting voltage, the resting capacitance, or the resting resistance of a portion of the conductive layer corresponding to the first display position of the virtual input, relative to a previously obtained resting voltage, resting capacitance, or resting resistance of the portion of the conductive layer corresponding to the first display position of the virtual input satisfies predetermined criteria, the virtual input may be repositioned from the first position to the second position.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which:

FIG. 5 is an illustration of a touchscreen display in accordance with instant disclosure including an repositionable virtual input according to an aspect of the instant disclosure;

DETAILED DESCRIPTION

Figure 1:
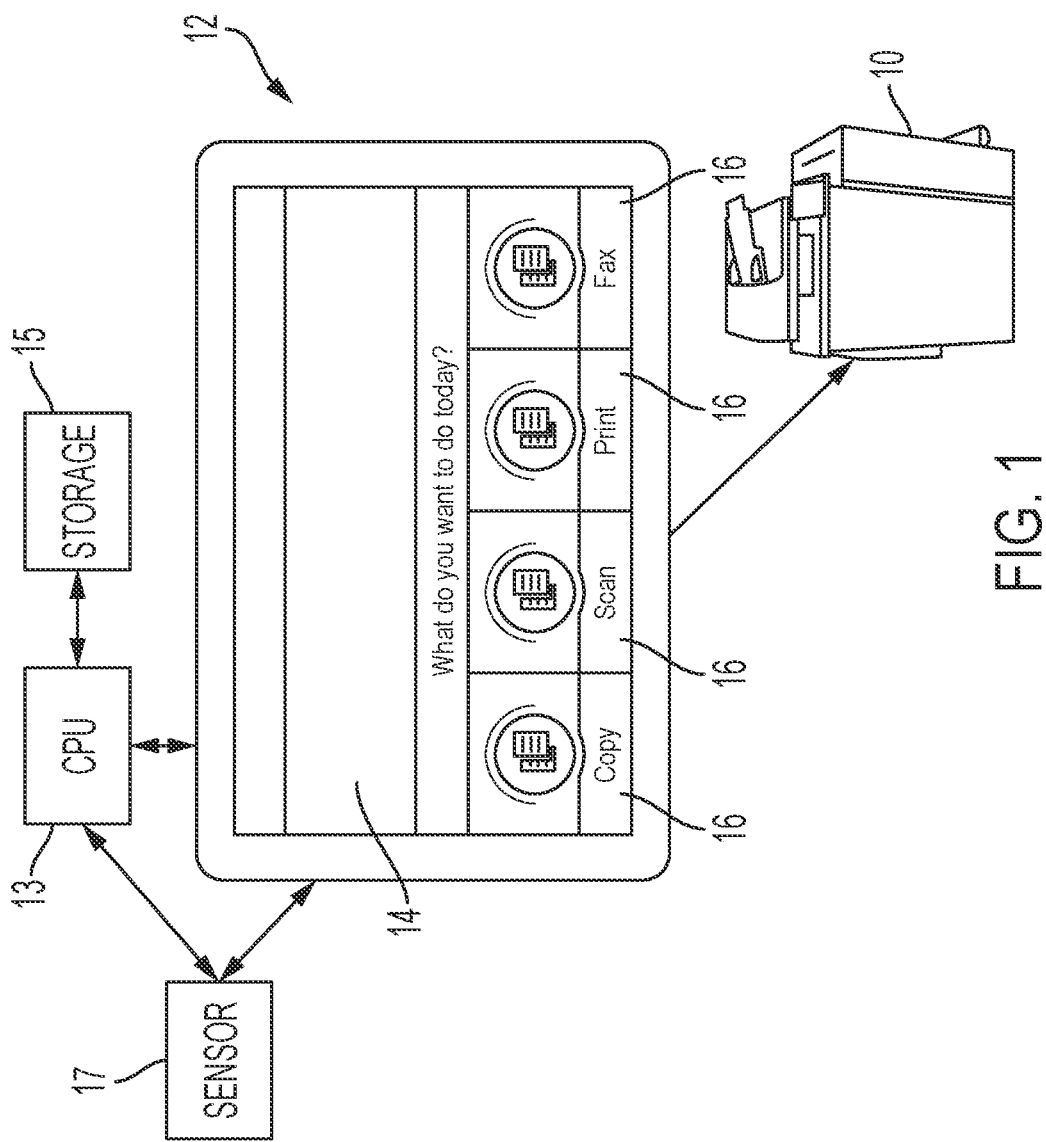
FIG. 1 is an illustration of a touchscreen display of a printer displaying a "home" screen.

At the outset, it should be appreciated that like drawing numbers on different drawing views identify identical, or functionally similar, structural elements of the embodiments set forth herein and the drawings may be drawn to scale and/or purposefully not drawn to scale so as to emphasize certain regions, features and concepts. Furthermore, it is understood that the disclosed aspects are not limited to the particular materials, methodologies, and modifications described and as such may, of course, vary. It is also understood that the terminology used herein is for the purpose of describing particular aspects only, and is not intended to limit the scope of the disclosed embodiments, which are limited only by the appended claims.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some aspects of methods, devices, and/or materials are now described.

Unless specifically defined otherwise, all technical and scientific terms used herein have the same meaning as commonly understood to one of ordinary skill in the art to which these aspects belong. As used herein, the terms/phrases "touchscreen", "touchscreen display" and the like are intended to refer to computer programmable resistive, capacitive, infrared (IR), surface acoustic wave, etc., types of electronic input/output display devices capable of displaying visually perceptible information. Such touchscreen displays typically include a coverscreen, a conductive layer, and a display device displaying one or more so-called virtual input buttons, virtual input fields or software generated input buttons or input fields, which are displayed behind the coverscreen, yet which are capable of communicating an input from a user upon the user making contact with the coverscreen. Hence, as used herein, the phrase "virtual input button" and like phrases are intended to refer to software generated virtual input buttons, input fields and/or other visually perceptible information displayed on a touchscreen type display, which are capable of communicating an input from a user upon the user interacting with the coverscreen of the touchscreen display corresponding to the virtual input button, input field, or visually perceptible information (e.g., a hyperlink), for example, as may occur upon contact of an implement such as a user's finger, which may or may not be covered (e.g., with a glove), other digit, stylus, or like implement, with the coverscreen of the touchscreen display corresponding to the virtual input button, input field, or visually perceptible information (e.g., a hyperlink), and/or upon such implement coming into near contact with the coverscreen of the touchscreen display proximate the virtual input button, input field, or visually perceptible information (e.g., a hyperlink) displayed on the touchscreen, so as to result in an input of the virtual input button, input field, or visually perceptible information.

Figure 11:
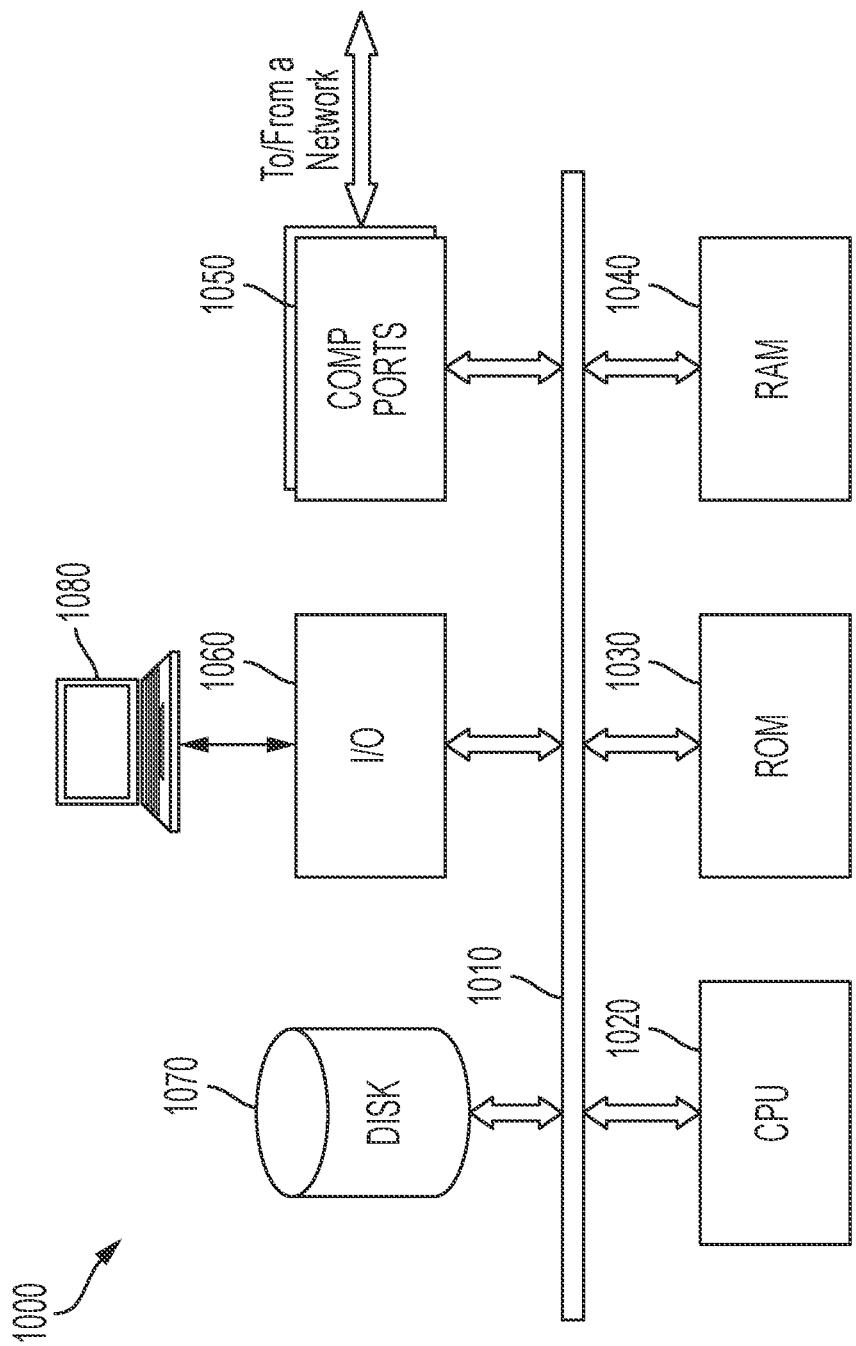

Adverting now to FIG. 11, which depicts an architecture on which the teachings of the instant disclosure may be implemented and realized and includes a functional block diagram illustration of a computer hardware platform which includes user interface elements (e.g., a touchscreen display of the instant disclosure). Computer 1000 may be a general-purpose computer or a special purpose computer and can be used to implement any component of the present teachings, as described herein. For example, the present teachings may be implemented on a computer such as computer 1000, via its hardware, one or more software programs, firmware, or combinations thereof. Although only one such computer is shown, for convenience, the computer functions relating to the present teaching as described herein may be implemented in a distributed fashion on a number of similar computer platforms, to, for example, distribute processing load. Examples of computers and computer systems, environments, and/or configurations that may be represented by the components illustrated in FIG. 11 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

The computer 1000, for example, includes one or more communications units 1050 connectable to and from a network connected thereto to facilitate data communications. Communications units can include network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computer 1000 through communications unit 1050 (i.e., via the Internet, a local area network, or other wide area network). From communications unit 1050, software, program software and data can be loaded onto a non-transitory computer readable medium, such as storage device 1070.

The computer 1000 also includes a central processing unit (CPU) 1020, in the form of one or more processors, for executing program instructions stored on a non-transitory computer readable storage medium. The exemplary computer platform includes an internal communication bus 1010, program storage and data storage of different forms, e.g., data storage device 1070, read only memory (ROM) 1030, or random access memory (RAM) 1040, solid state hard drives, semiconductor storage devices, erasable programmable read-only memories (EPROM), flash memories, or any other computer readable storage media that is capable of storing program instructions or digital information for various data files to be processed and/or communicated by the computer, as well as possibly program instructions to be executed by the CPU. The computer 1000 also includes an I/O component 1060, supporting input/output flows between the computer and other components therein such as user interface elements 1080 (e.g., a display device/monitor and/or one or more input devices such as a keyboard, mouse, touchpad, touchscreen according to the instant disclosure, speaker, microphone, etc.). The computer 1000 may also receive programming and data via network communications.

Hence, aspects of the methods and processes, as outlined herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, solid state drives, disk drives and the like, which may provide storage at any time for the software programming.

All or portions of the programming and/or software for operating the touchscreen display, may at times be communicated through a network such as the Internet or various other communications networks. Such communications, for example, may enable loading of the programming and/or software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of machine or computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it/they may also be implemented as a software only solution, e.g., an installation on an existing server. In addition, the systems, methods and processes may be implemented as firmware, firmware/software combination, firmware/hardware combination, or a hardware/firmware/software combination.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer or entirely on the remote computer or server. In the latter scenario, the remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present teachings are described herein with reference to flowchart illustrations and/or block diagrams of methods, apparatus (systems), and computer program products according to aspects of the disclosure. It will be understood that each block of any flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Adverting now to FIG. 1, as shown in FIG. 1 which is an illustration of touchscreen display 12 of a printing machine 10 displaying a home screen 14 including one or more virtual input buttons 16 corresponding to user selectable operations performable by the printing machine (e.g., "Copy", "Scan", "Print" and "Fax"), it is seen that the touchscreen display 12 is operatively arranged for electronic communications with a Central Processing Unit (CPU) 13 of a computer, as well as a non-transitory computer readable storage medium 15, e.g., via the CPU. As may also be appreciated from FIG. 1, touchscreen display 12 is configured to communicate with, and/or includes one or more sensors 17, capable of receiving environmental information, e.g., electronic signals from the touchscreen display 12 transmitted as a result of an input of an operation by a user, or as a result of, for example, a prescheduled diagnostic program implemented on the touchscreen display, or as a result of instructions that may be received, for example, from a remotely connected device. The environmental information received by the one or more sensors 17 may correspond to a voltage, a resistance, or a capacitance, etc., of electrode layers of the touchscreen display and/or may correspond to a change in a voltage, a change in a resistance, or a change in a capacitance, etc., of the electrode layers of the touchscreen display upon operation thereof and/or may correspond to other environmental factors. Such changes in voltage, resistance or capacitance, etc., may be measured or compared with, for example, so-called resting or baseline voltages, resistances, or capacitances, etc. of the touchscreen display (e.g., when operations are not being input into the touchscreen display), or measured or compared with other preexisting data or one or more predetermined thresholds, etc., and/or information stored in a non-transitory computer readable storage medium, such as one or more storages 15. Sensors 17 and methods for receiving such types of information and signals from the touchscreen display are generally known in the art and therefore, are not discussed further herein. Other environmental information such as temperature and/or humidity may also be obtained by the one or more sensors 17 in communication with the CPU.

Figure 2:
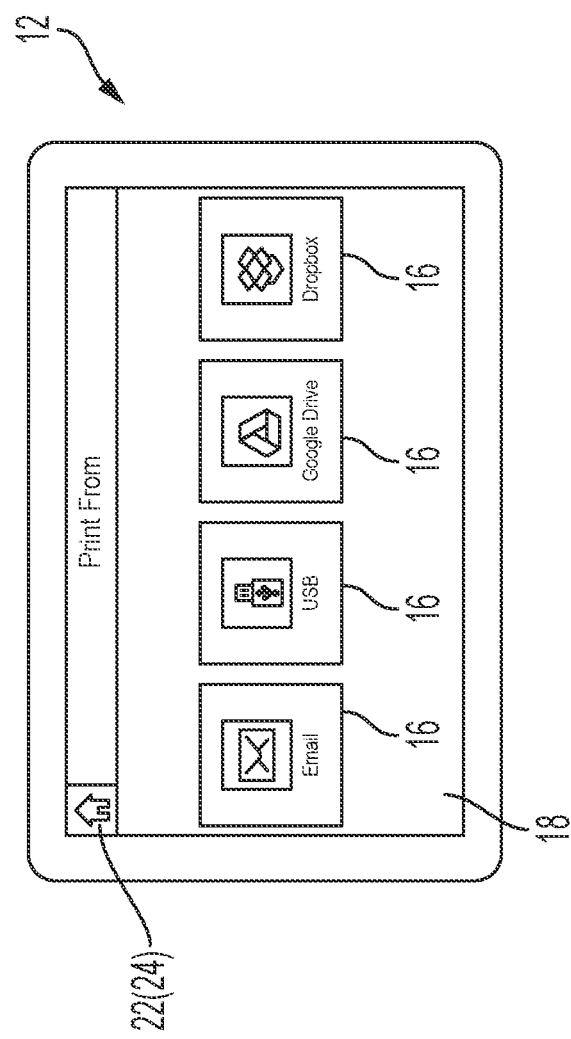
FIG. 2 is an illustration of a touchscreen display displaying an operations screen.

As shown in FIG. 2, the CPU can be programmed to cause the touchscreen display 12 to, upon receiving a user input of a virtual input button 16 corresponding to a print operation, for example, direct the display of the touchscreen display to shift from home screen 14 of FIG. 1 to operations sub-menu screen 18 of FIG. 2. Operations sub-menu screen 18 corresponding to the printing operations input may include, for example, virtual input buttons 16 corresponding to sources or files from which a document to be printed may be obtained. As shown in FIG. 2, such sources or files are shown as including an email source, a USB source, and one or more virtual drives and/or so-called cloud storage locations. Of course, other storage sources, devices and/or files from which documents to be printed may be obtained are contemplated, as is printing directly from an existing hard copy document. FIG. 2 also serves to illustrate that operations sub-menu screen 18 includes home button 22, which is a virtual input button that may be repositioned, disposed in a first position 24 on the operations sub-menu screen 18. Operation of the home button 22 causes the operations sub-menu screen 18 to shift back to the home screen 14 of FIG. 1.

Figure 3A:
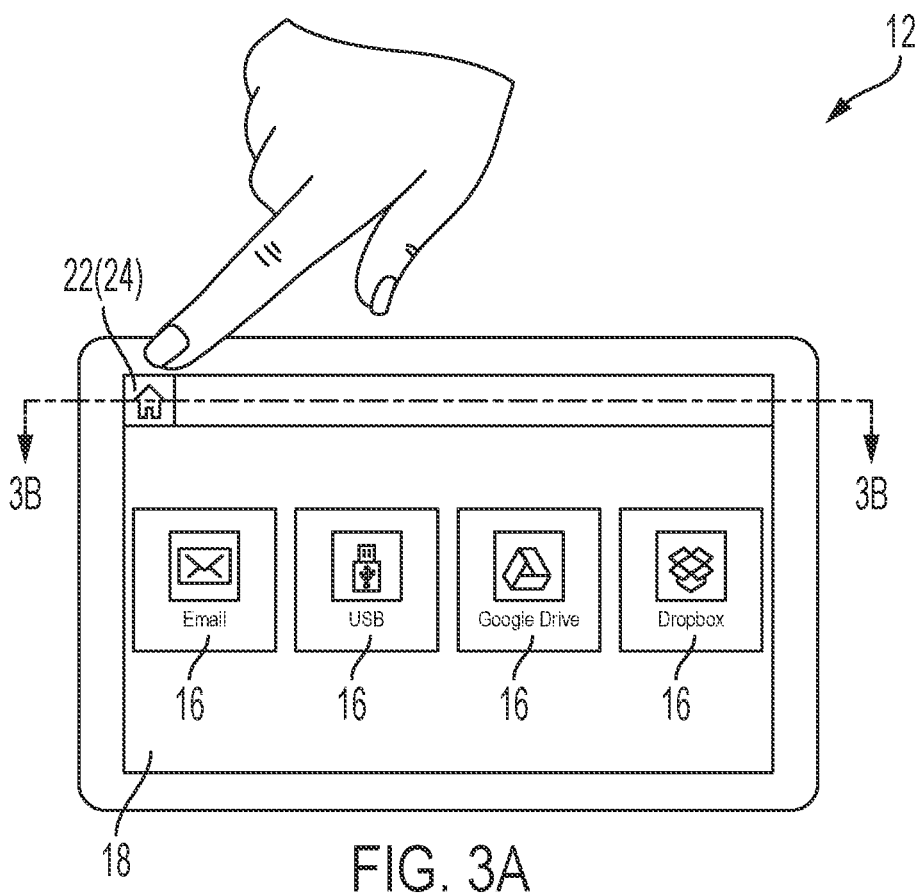
FIGS. 3A and 3B are illustrations of a touchscreen display and a cross-sectional diagram thereof taken generally along line 3B-3B, respectively.
Figure 3B:
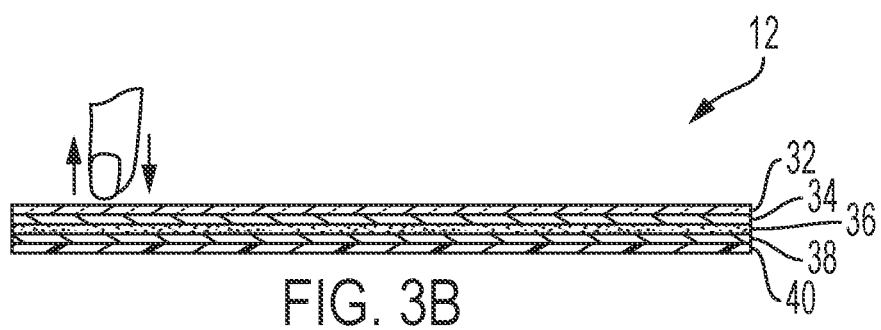

As shown in FIGS. 3A-3B, touchscreen display 12 is shown as generally including a transparent glass or plastic coverscreen 32 disposed atop a conductive layer including a first electrode layer 34 (e.g., a y-electrode), which first electrode layer is adhered to a second electrode layer 38 (e.g., an x-electrode layer) via an intermediate adhesive layer 36. The second electrode layer 36 is disposed atop an electronic display such as a LCD device, which displays information to be displayed on the touchscreen, such as a virtual input button. As may be appreciated, additional layers may be incorporated into the touchscreen display (e.g., additional adhesives or optical layers) and/or the order of the layers may be modified as necessary. Such types of touchscreen displays, and their general layers, are known and are not further described herein.

As shown in FIG. 3A, in the case of a relatively new, undamaged, and/or normally operating touchscreen display, operation of a virtual input button 16, for example, the home button 22 in the first position 24, typically results in normal operation of the touchscreen display, i.e., the first and second electrode layers 34, 38 of the conductive layer properly sense an input corresponding to the location of the home button 22 in the first position 24 and transmit signals corresponding to the input to the CPU to cause the currently displayed screen to revert back to the home screen 14.

Figure 4A:
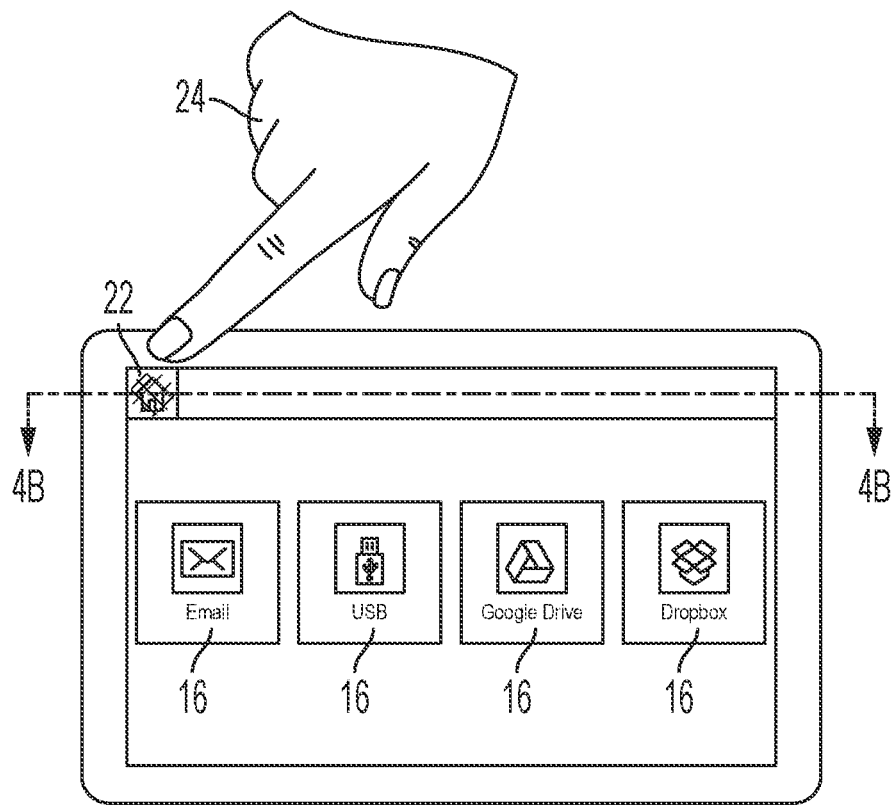
FIGS. 4A and 4B are illustrations of a touchscreen display and a cross-sectional diagram thereof taken generally along line 4B-4B, respectively, which show the effects of repetitive use of a virtual input of the touchscreen display.
Figure 4B:
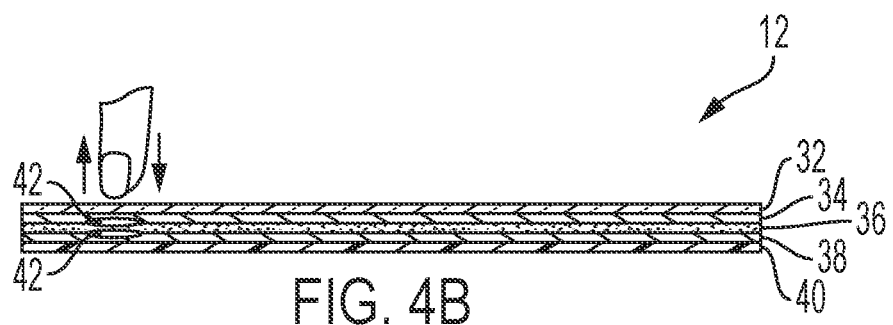

However, as shown in FIGS. 4A-4B, in the case of a relatively older touchscreen displays, or touchscreen displays that may have relatively more "flex" as compared to more robust touchscreen displays, virtual input buttons that may be subject to repetitive use, tapping, and/or that may be exposed to the application of excessive pressures by a user, e.g., the home button 22, such repetitive use and/or excessive pressure typically results in the premature wear of the touchscreen display corresponding to the location of the repetitively used virtual input button. That is, for example, as shown in FIG. 4A, repetitive use of the home button 22 at position 24 is illustrated as having resulted in the premature wear or marring of the surface of the glass or plastic coverscreen 32 corresponding to the home button 22 at position 24, i.e., the wear is shown by the hash marks/blurring/scratches of the button 22 at position 24 in FIG. 4A. More importantly, however, as shown in FIG. 4B, such repetitive use, tapping, and/or the application of excessive pressure to the home button 22, has resulted in delamination of the first and second electrode layers 34, 38 from the adhesive layer 36 corresponding to the home button 22 at the first position 24, which delamination has resulted in one or more gaps 42 being formed between the electrode layers. When delamination occurs and/or gaps 42 are formed, the first and second electrode layers 34, 38 may not as effectively sense an input operation made by a user and and/or signals corresponding thereto may not be properly processed and/or communicated to the CPU. This often results in a delay in proper operation, or the failure of the touchscreen display to properly operate altogether, e.g., in the case of operation of the home button 22 at position 24, reversion to the home screen 14 of FIG. 1 may be delayed or inhibited altogether. In addition to the above, once delamination occurs or gaps 24 form, proper operation of the home button 22 will tend to become progressively worse with additional use. When responsiveness is delayed or reduced, in an effort to operate the touchscreen display, most users will tend to apply additional excessive pressure, or additional taps, upon the home button 22, which has the effect of accelerating further delamination and increasing damage to the touchscreen display. In addition to the above, other factors such as heat and humidity can affect the proper operation of the touchscreen display and/or exacerbate problems associated with delamination. Hence, it can be desirable to reposition a repetitively used virtual input button more often when factors such as temperature or humidity may are likely to further negatively affect the touchscreen display.

Adverting now to FIGS. 5-10B, as generally illustrated in such figures, a touchscreen display 12 in accordance with the instant disclosure is configured to avoid and/or prevent or minimize the aforementioned drawbacks associated with wear/marring/delamination of a touchscreen resulting from repetitive use of a virtual input button. This is accomplished by providing a virtual input button that is repositionable about the touchscreen display 12. As shown in FIG. 5, for example, touchscreen display 12 including a repositionable virtual input button, e.g. home button 22, in accordance with the instant disclosure can be configured such that one or more virtual input buttons may be repositioned from a first position, for example, position 24 of home button 22 shown in FIG. 3A, to one or more second positions, for example, positions 26-30 shown in FIGS. 5-6. The touchscreen display 12 may be configured such that the repositioning of a repositionable virtual input button, e.g., home button 22, may be performed, for example, automatically upon a preset or predetermined threshold being satisfied, or may be performed manually by an operator or user via an appropriate interactive user interface or menu of the touchscreen display 12.

Where repositioning of the repositionable virtual input button occurs automatically, such may occur in an incremental-type fashion based on predetermined or preset positional criteria stored in a memory. For example, dashed lines 20 of FIG. 5 generally illustrate incremental positions that home button 22 has previously occupied prior to being incrementally repositioned to position 26. With regard to the automatic incrementing of home button 22, as shown in the zoomed in portion of FIG. 5, touchscreen display 12 including a repositionable virtual input button, e.g. home button 22, according to the instant disclosure can be automatically incremented a preset distance d relative to a previously occupied position, or incremented based on a preset proportional distance. As also shown in FIG. 5, the preset distance d can be such that a current position of home button 22 partially overlaps with a previous position of the home button 22, or can be otherwise (e.g., non-overlapping). Distance d may be predefined as a factory setting or modified as desired by a user or operator, for example, as may occur via an appropriate interactive user interface or menu of the touchscreen display that allows the distance d to be modified or set by user. Preset or predetermined thresholds causing/prompting the repositioning of repositionable virtual input button, e.g., home button 22, (either automatically or manually) can include, but are not limited to, for example, one or more of: a total number of inputs attempts performed using the virtual input button at a position, a number of successful input attempts performed using the virtual input button at a position, a number of failed input attempts of the virtual input button at a position, a ratio of successful inputs attempts/failed inputs attempts at a position, a time period that the virtual input button has remained in a position, a time of day, a time of week, a time of month, a time of year, a temperature or a humidity (as monitored by an appropriate sensor), a measured change in a resting voltage, a resting capacitance, or a resting resistance of a portion of the conductive layer relative to a previously obtained resting voltage, resting capacitance, or resting resistance of the portion of the conductive layer as may be measured by an appropriate sensor at a position. Hence, the touchscreen display can be programmed such that upon a virtual input button at a first position satisfying one or more of the predetermined criteria, the virtual input button may be automatically incrementally repositioned according to preset instructions to second and subsequent positions on the touchscreen display, or a user may be prompted to manually increment or reposition the virtual input button, for example, upon the display of a message window to the display indicating the same and/or requiring that a user manually reposition a virtual input button to a second or subsequent position before further operations may be performed. As may be appreciated from the above, information and data corresponding to the preset or predetermined thresholds may be input, for example, as a factory setting or set by a user, and information and/or data to be compared therewith may be collected and saved in the one or more storages 17 based on use of the touchscreen display 12, or may be collected from the one or more sensors 17 and saved to the one or more storages 15 for subsequent comparison with preexisting data or thresholds.

Figure 6:
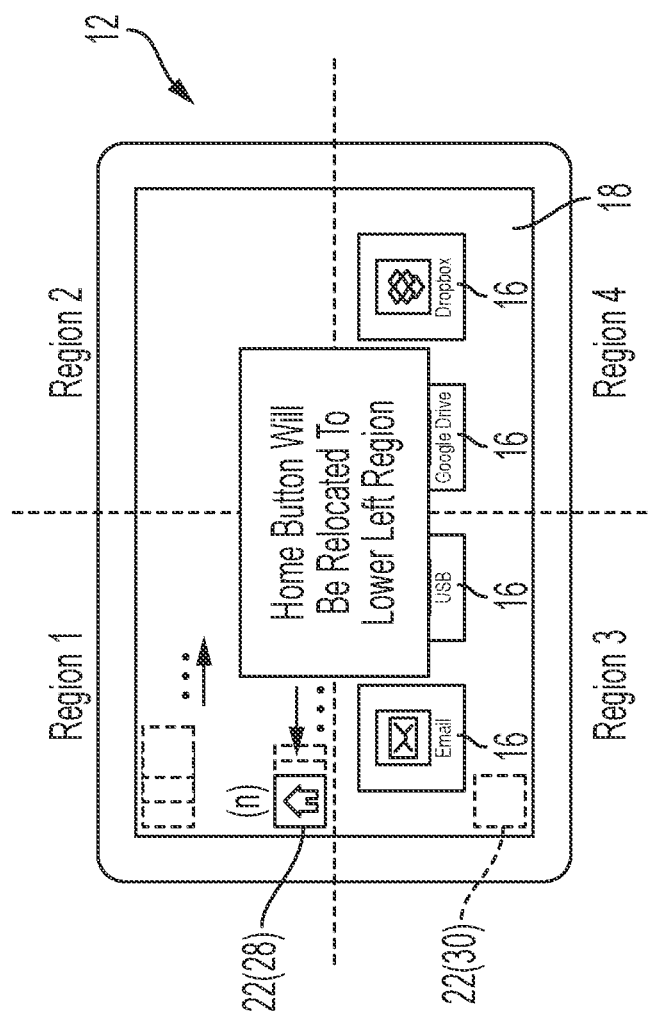
FIG. 6. is an illustration of a touchscreen display in accordance with instant disclosure including a repositionable virtual input according to an aspect of the instant disclosure.

As shown in FIG. 6, automatic incremental repositioning of a virtual input button 16 can be programmed to occur such that a virtual input button, e.g. home button 22, is first automatically incremented within a first sub-region of the touchscreen display, prior to being shifted a second sub-region of the touchscreen display—the reasons for this including, but not limited to, for example, ease of a user locating a repositioned virtual input button and/or for efficiently and effectively utilizing the available area of the touchscreen display. That is, FIG. 6 shows home button 22 as being first automatically incremented within sub-region region 1 of the touchscreen display, from first position 24 to nth position 28. As also shown in FIG. 6, when the home button 22 has been automatically incremented to the nth position 28 of the first sub-region and there are no remaining positions in the first sub-region to which the home button 22 may be automatically incremented, the home button 22 can be automatically shifted to a first position 30 of another sub-region, e.g., sub-region 3. As also shown in such figure, in the case of the automatic shifting of a virtual input button, e.g., home button 22, from one sub-region to another sub-region, a message may be displayed to the touchscreen display so to alert a user as to the region or area of the touchscreen display to which the virtual input button will be shifted/relocated. In the case of FIG. 6, for example, a message window indicating that the "Home Button Will Be Relocated To Lower Left Region" is displayed to the touchscreen display so as to indicate that the home button will be located to position 30, which may be identified in an appropriate manner, e.g., by the use of dashed lines, shading, color coding, a flashing icon, etc. As may be appreciated, while the virtual input button, e.g. home button 22, is described and illustrated as being shifted from the first sub-region to the third sub-region, shifting can occur to another sub-region, which sub-region may be preset via a factory setting or may be preset by an operator, for example, via an appropriate interactive interface or menu of the touchscreen display. Additionally, while FIG. 6 illustrates the touchscreen display as being parsed into four sub-regions, the number of sub-regions may be more or less than four. The touchscreen display 12 may also be configured such that a virtual input button, e.g., home button 22, may only be repositioned (either manually or automatically) to positions satisfying certain criteria, e.g., positions not having been previously occupied by a virtual input button and/or a not to positions identified as being at the ends of their useful lifespans or damaged, as may be measured by a number of inputs received or a change in one or more of a voltage, resistance or capacitance of an electrode layer or the conductive layer based on data received from one or more sensors connected thereto. Additionally, touchscreen display 12 may also be configured such that a virtual input button, e.g., home button 22, may only be repositioned (either manually or automatically) from a first sub-region to a second sub-region of the touchscreen display only after all locations in a first sub-region have all been previously occupied by the virtual input button, e.g., home button 22.

Figure 8A:
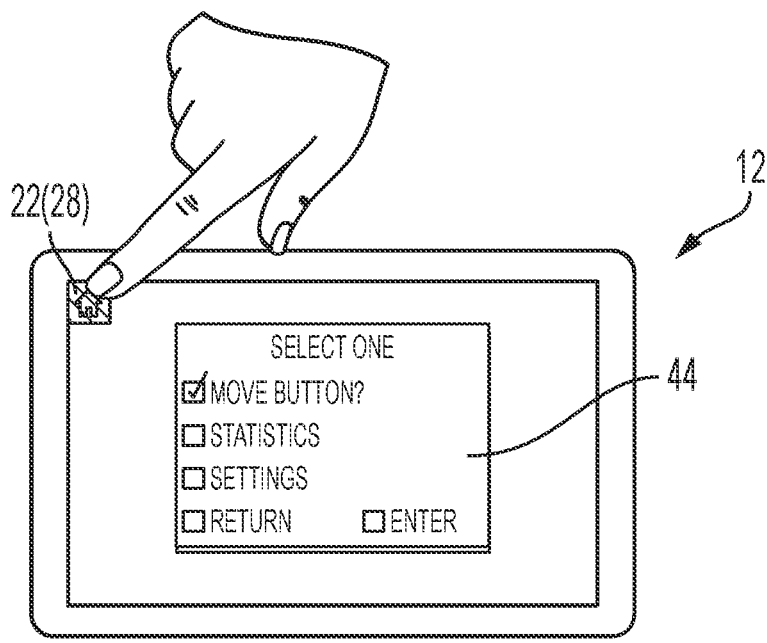
Figure 8B:
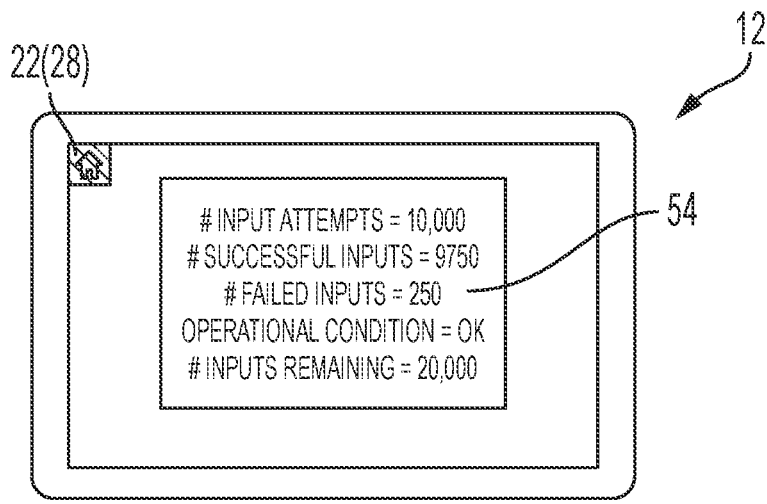
Figure 9A:
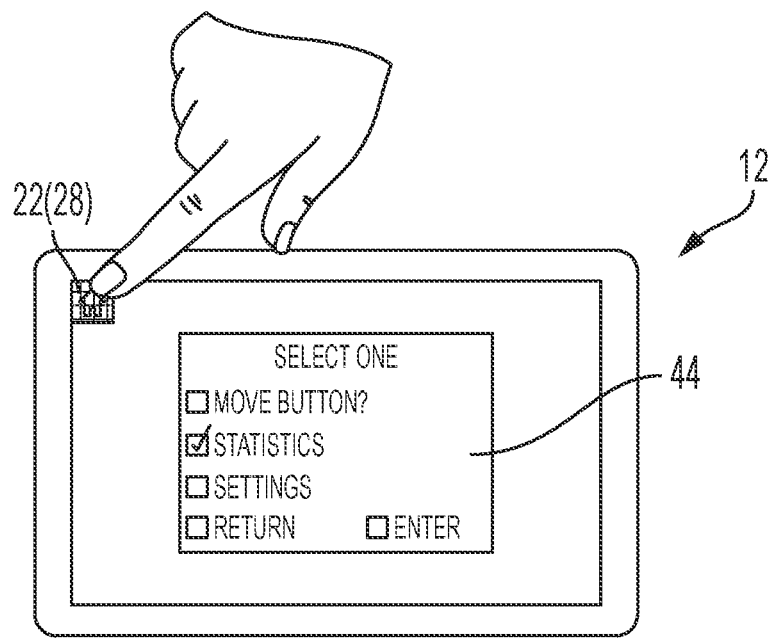
Figure 9B:
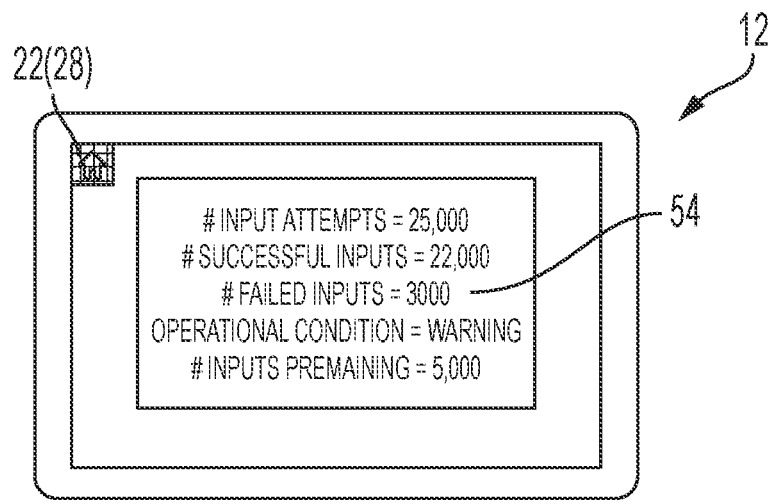
Figure 10A:
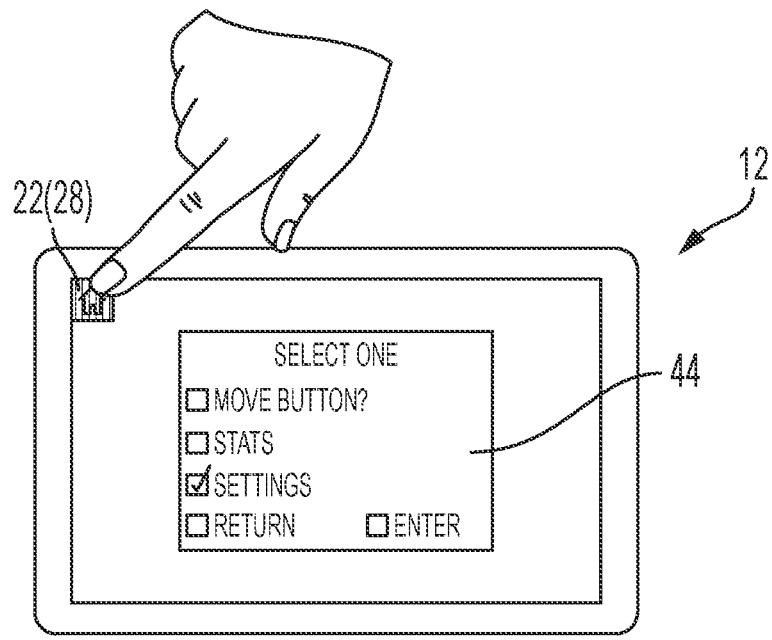
Figure 10B:
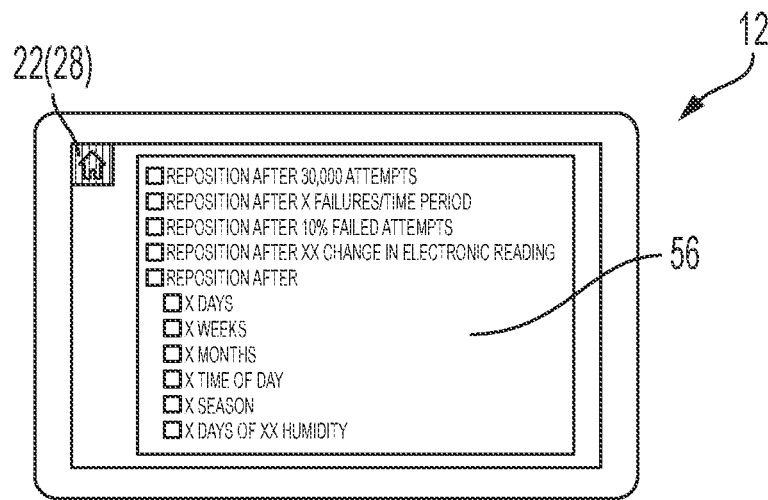

Referring generally to FIGS. 7A-10B, the touchscreen display 12 may be programmed such that a repositionable virtual input button, e.g., home button 22, may appear in one or more colors or include appropriate markings indicative of the status of its expected remaining useful lifespan at a particular position. That is, as shown in FIGS. 7A-8B, home button 22 is illustrated as shaded in the color green to indicate, for example, that the home button 22 at its current position has sufficient remaining useful lifespan and/or that its operating condition is satisfactory. By contrasts, as shown in FIGS. 9A-9B, home button 22 is illustrated as shaded in the color yellow to indicate, for example, that the remaining useful lifespan or operating condition of the home button at its current position is limited. Finally, as shown in FIGS. 10A-10B, home button 22 is illustrated as shaded in the red yellow to indicate, for example, that the home button 22 at its current position has little, if any, remaining useful lifespan and/or that its operating condition is unsatisfactory and repositioning is imminent or necessary. The aforementioned useful lifespans and operating conditions may be determined based upon, for example, a total number of inputs made using a virtual input button at a position as compared with a preset threshold, and/or its operating condition may be determined based on information received from the one or more sensors 17 configured to monitor the conductive layer. In another aspect, the previously discussed color coding may occur upon a user performing a press and hold operation upon home button 22 for a preset period of time. That is, upon pressing and holding a repositionable virtual input button, e.g., home button 22, for a preset time, the home button 22 may become color coded, shaded or the like, to indicate the remaining lifespan of the home button at its current position. For example, when the number of taps or a measured voltage, capacitance, or resistance, etc. of the conductive layers corresponding to the home button 22 at a particular position is within operating parameters, e.g., considerably below a preset threshold, pressing and holding the home button 22 for the preset time can cause the home button to be color coded in a green color, for example, to indicate that the number of taps or the measured voltages, capacitances, or resistances, etc. are all within acceptable levels. As the number of taps or measured voltages, capacitances, or resistances, etc. approach or exceed certain preset threshold(s), pressing and holding of the home button 22 for the preset period can cause the home button 22 to be color coded in a yellow color, shaded, etc. so as to indicate that the home button 22 at its current position is approaching the end of its lifespan (See FIGS. 9A-9B), or color coded in a red color, shaded, etc. so as to indicate that the home button 22 at its current position has exceeded its recommended lifespan and continued use of the home button 22 at its current position is likely to result in damage to the touchscreen display, i.e. delamination and gap formation (See FIGS. 10A-10B).

Referring back to FIGS. 7A-7B, FIGS. 7A and 7B illustrate that in one aspect, a user or operator may perform an operation on a repositionable virtual input button, e.g., home button 22, to perform, for example, a manual repositioning operation, an operation to obtain information pertaining to the repositionable virtual input button, e.g., home button 22, at its current position, and/or to apply and/or perform one or more later described settings operations pertaining to the repositionable virtual input button/position.

Figure 7A:
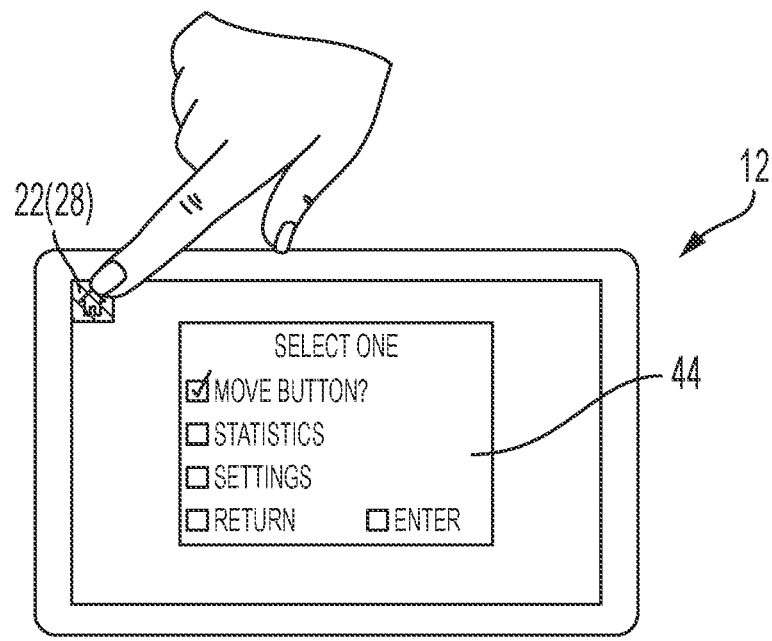
FIGS. 7A-10B are illustrations of exemplary operations/settings that may be performed/applied to a touchscreen display in accordance with instant disclosure; and, FIG. 11 is a schematic illustration of an exemplary system architecture configured to implement the apparatuses, systems and methods according to the instant disclosure.

That is, as also shown in FIG. 7A, performing a pressing and holding operation on the home button 22 for a preset time can also serve to cause a button sub-menu 44 to be displayed to touchscreen display 12. The button sub-menu 44 may be configured to allow a user to select a repositioning operation, to obtain statistical information related to the home button 22 at its current position, or perform an operation pertaining to the settings of a repositionable virtual input button or perform other operations, such as defining a distance or proportional distance that a repositionable virtual input button is to be automatically incremented (not shown).

Figure 7B:
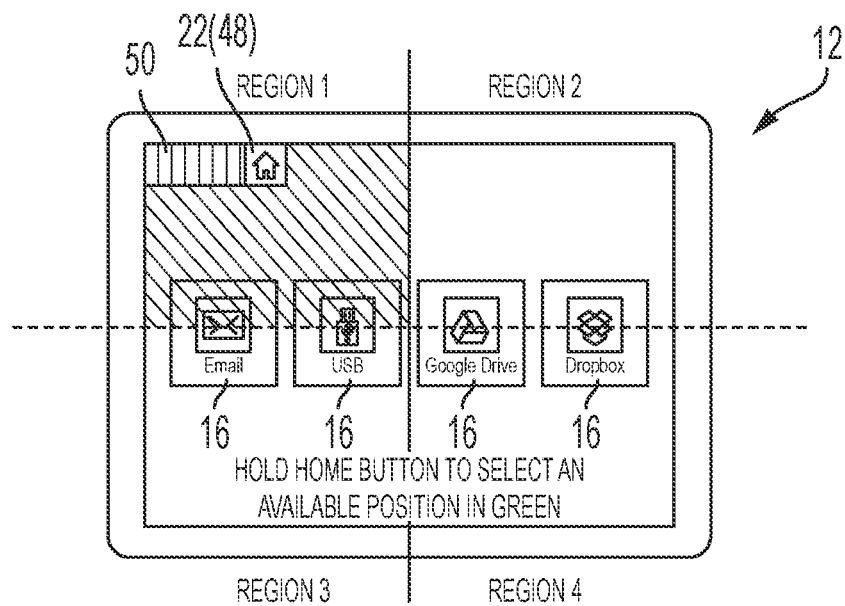

In the case of performing a manual moving or repositioning operation, upon a user selecting the option to move or reposition a repositionable virtual input button, e.g., home button 22, and selecting an enter operation as shown in FIG. 7A, the button sub-menu 44 may be subsequently closed and availability display screen 46 may be presented, which shows the current position 48 of home button 22, one or more unavailable positions or areas 50 (which may be previous positions occupied by the home button 22 or positions a user may be prevented from selecting based on prior usage data/operational condition data or other factors), and available positions or areas 52 to which the home button 22 may be manually repositioned. As may be appreciated from the figure, unavailable positions or areas 50 may be color coded red, or with other appropriate markings, to indicate that such positions or areas are not available for repositioning, and available positions or areas 52, may be color coded green or with other appropriate markings to indicate that they are available for repositioning. While FIG. 7B shows that available positions or areas 52 are only shown in sub-region 1, such is only for purposes of illustrating that it may be desirable—for purposes of easily locating a subsequently repositioned virtual input button—to first present options for repositioning a virtual input button, e.g., home button 22, within its current sub-region before presenting options for repositioning it to another sub-region. That said, manual repositioning of a virtual input button, e.g., home button 22, may be performed from one sub-region to another region as may be desired by a user, where possible. For example, as it may be desirable to reposition home button 22 from a first corner of the touchscreen display to a second corner of the touchscreen display for ease of locating the home button 22, a user may reposition the home button to such second corner position as desired—provided that the second corner position is an available position or area 52. Additionally, as shown in FIG. 7B, in order to manually reposition the home button 22 to a desired position, a user may press and hold the home button 22 (while at position 48), and while maintaining the pressing and holding operation, for example, move the home button 22 to a new available position or area 52. To this end, a display window or message, for example, stating, "HOLD HOME BUTTON TO SELECT AN AVAILABLE POSITION IN GREEN", which prompts the user to perform such action, may be presented to the touchscreen display so as to provide repositioning instructions to a user.

Referring now to FIGS. 8A-9B, in the case where a user desires to obtain statistical information pertaining to a repositionable virtual input button, e.g., home button 22, at its current position, as shown in FIGS. 8A and 8B, a user may press and hold the home button 22 for the preset time. Similar to the above, performing a pressing and holding operation of the virtual input button can cause the virtual input button to become color coded or appropriately marked according to its currently measured lifespan (e.g., green in FIGS. 8A-8B, yellow in FIGS. 9A-9B, and red in FIGS. 10-10B, etc.) and/or can cause the button sub-menu 44 to be displayed. Upon a user selecting the statistics operation option and selecting the enter operation from the button sub-menu, a statistics sub-menu 54 may be displayed to the touchscreen display.

As shown in FIG. 8B, statistics sub-menu 54 may include information such as a number of input attempts made via a repositionable virtual input button 16 (e.g., 10,000) at a position, a number of successful inputs (e.g., 9,750) at a position, a number of failed inputs (e.g. 250) at a position, etc., which information has been previously collected and saved to the one or more storages 15. Statistics sub-menu 54 may also include information pertaining to an operational condition of that portion of the touchscreen display corresponding to a position of a repositionable virtual input button (e.g. OK), as may be based on, for example, information pertaining to a voltage, a resistance or a capacitance of the touchscreen display at that position as obtained from one or more sensors 17, and compared with data stored in one or more storages 15. Statistics sub-menu 54 may also include information pertaining to an expected number of inputs remaining (e.g., 20,000) before the number of inputs reaches a predetermined threshold. As shown in the figure, for example, as the number of inputs remaining in FIG. 8B is shown as being 20,000, virtual input button may be color coded in the color green, or have other appropriate markings, to indicate that there is a number of allowable inputs remaining and/or that the operational condition of the repositionable virtual input button, e.g. home button 22, in the current position is acceptable.

By contrast, as shown in FIGS. 9A-9B, in the case where the number of remaining inputs of a repositionable virtual input button, e.g. home button 22, approaches a predetermined threshold (e.g., only 5000 inputs remaining) and/or the as measured operational condition of the virtual input button at its current position is sufficient, but may be less than satisfactory, a warning message may be displayed to the touchscreen display and the repositionable virtual input button may be color coded in a yellow color, or provided with other markings, for example, to indicate that the virtual input button at the current position is approaching the end of its lifespan. Similarly, where the number of remaining inputs of the repositionable virtual input button has exceeded a predetermined threshold and/or the as measured operational condition of the repositionable virtual input button at its current position is less than sufficient, a warning message may be displayed to the touchscreen display and the virtual input button may be color coded in a red color or other appropriate markings (See FIGS. 10A-10B) to indicate, for example, that the repositionable virtual input button at the current position is at the end of its lifespan and/or that further operation of the repositionable virtual input button at the current position is likely to result in further damage to the touchscreen display.

Additionally, in the case where there a few, if any, available positions or areas 52 on the touchscreen display to which a repositionable virtual input button may be repositioned, a so called self-reporting message indicating that the touchscreen display is approaching the end of its useful lifespan may be communicated to a central computer in order to, for example, conduct further diagnostic tests on the touchscreen display and/or to report a need to perform repairs or replacement of the touchscreen display prior to its failure. Such messages may, of course, be issued based on other factors and/or upon the occurrence of other events.

Referring now to FIGS. 10A-10B, in the case where a user desires to apply settings to a repositionable virtual input button, e.g., home button 22, a user need merely press and hold the home button 22 for the preset time. Similar to the above, performing a pressing and holding operation of the repositionable virtual input button can cause the button to become color coded, or otherwise appropriately marked, according to its currently measured lifespan (green in FIGS. 8A-8B, yellow in FIGS. 9A-9B, and red in FIGS. 10-10B) and can cause the button sub-menu 44 to be displayed. Upon a user selecting a settings operation option, and then selecting the enter operation from the button sub-menu, a settings sub-menu 56 may be displayed to the touchscreen display. From the settings sub-menu 56, a user may apply a number of presets or thresholds to a repositionable virtual input button and/or a position corresponding to a repositionable virtual input button. Such presets or thresholds can include, but are not limited to, for example, one or more of: a number of attempts made at a position after which a virtual input button may be repositioned, a number of failures at a position or a specific time period after which a virtual input button may be repositioned, a percentage of failures at a position after which a virtual input button can be repositioned, a change in the operational condition of a virtual input button at a position as measured by a change data received from the one or more sensors 15, and/or a time period or other condition by which a virtual input button may be repositioned. For example, as humidity is known to have negative effects upon certain types of touchscreen displays, during certain times of a year, such as the summertime, for example, it may be of benefit to ensure that a repositionable virtual button is repositioned from one position to another position on the touchscreen display more frequently as compared to other less humid times of the year—especially in the case where humidity as measured by a sensor may exceed certain thresholds for extended periods of time. Similarly, as use of a touchscreen display of, for example, a printing machine may be more likely to occur during certain times of day, e.g., the early morning when the number of printing operations may be high, it may be of benefit to ensure that a repositionable virtual input button is repositioned from one position to another position more frequently during that time as compared to the late afternoon when the printing machine may tend to be used much less. Of course, settings corresponding to other thresholds based on use, time, or operating condition of the touchscreen display may be applied.

Figure 12:
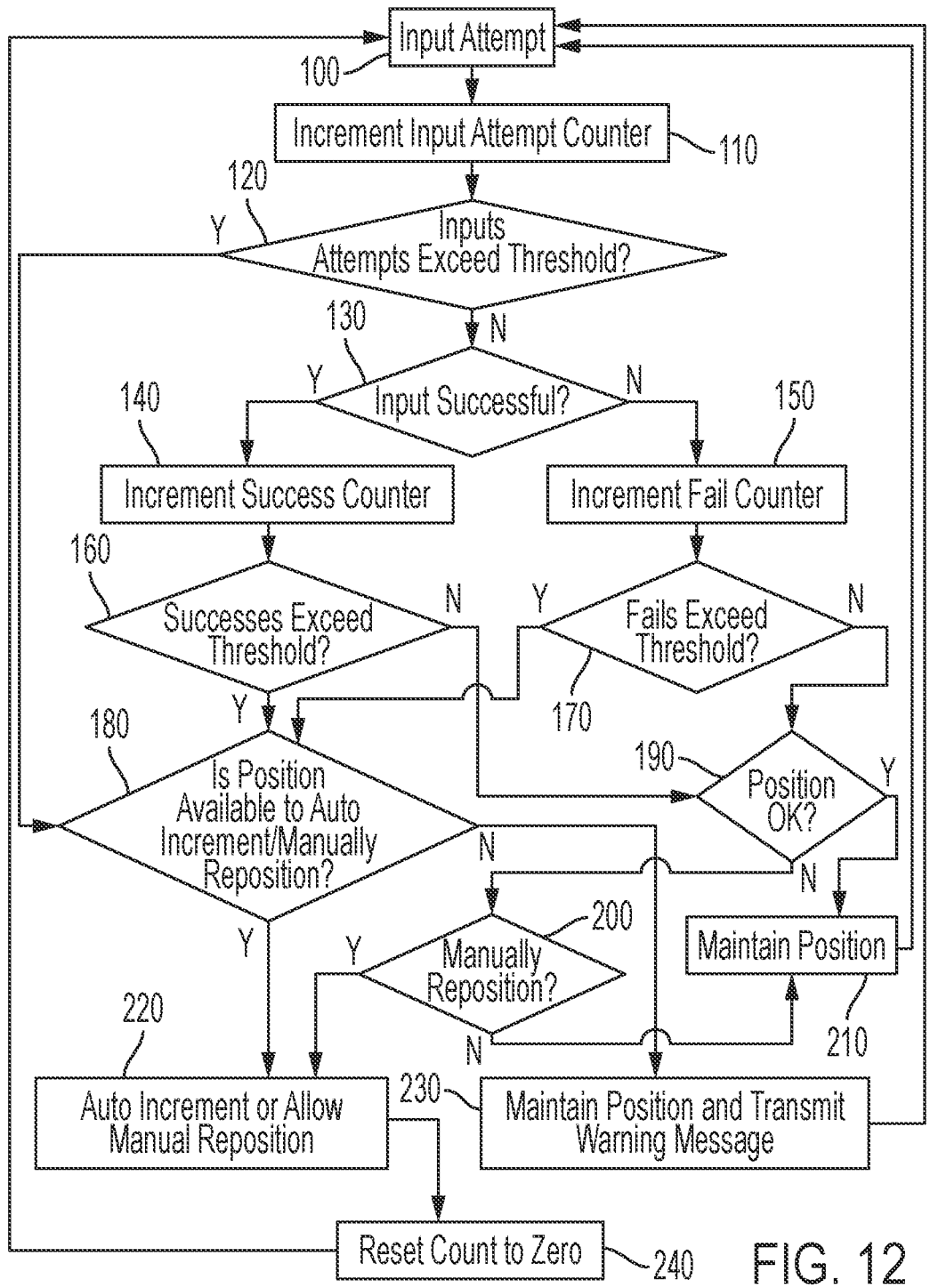
FIG. 12 is a flow diagram illustrating exemplary operations/processes performable by a touchscreen display in accordance with instant disclosure.

Adverting now to FIG. 12, which is a flow diagram illustrating one or more exemplary operations/processes/steps performable by a touchscreen display in accordance with instant disclosure and one or more repositionable virtual input buttons. It should be appreciated that the operations, processes and steps illustrated in FIG. 12 are but one example of operations, processes and steps that may be performed via a touchscreen display in accordance with instant disclosure, and that the instant disclosure is not to be limited to the specific order of operations, processes and steps set forth in FIG. 12. That is, the various operations, processes, and steps may occur according to the order of the particular steps depicted in FIG. 12, but may also be performed otherwise, i.e., one or more steps may occur in another order, or additional steps may be incorporated between one or more steps. Additionally, while FIG. 12 is described relative to input attempts, successful input attempts, failed input attempts, etc. and thresholds corresponding to the same, similar operations, processes and steps may be applied relative to voltages, resistances, capacitances, etc. obtained from of the touchscreen display and thresholds related thereto.

Referring now to FIG. 12, as may be appreciated from the figure, generally, at step 100 when an input attempt is made using a repositionable virtual input button, a signal corresponding to the input attempt of the repositionable virtual input button at its current position is transmitted to the CPU. Upon receipt thereof, at step 110 the CPU increments an input attempt counter, which input attempt counter may be data pertaining to a current total number of input attempts of the repositionable virtual input button made at its current position saved to the one or more storage devices 15. At step 120, the CPU then compares the current total of input attempts with a preset threshold of input attempts, which may be saved in the one or more storages 15, to determine whether the total number of input attempts is greater than the preset threshold.

Upon such comparison 120, in the case where the total number of input attempts exceeds the preset threshold of input attempts (Step 120: Y), based on data and information previously obtained, at step 180 the CPU then determines whether a position on the touchscreen display is available for purposes of repositioning the repositionable virtual input button. Where the CPU determines that a position is available (Step 180: Y), at step 220 the CPU then causes the repositionable virtual input button to be automatically incremented according to any preexisting rules or instructions, for example, according to a previously described distance or proportional distance, or may allow the virtual input button to be manually repositioned to another location by a user, for example, as previously described. In the case of automatic or manual repositioning, the CPU can cause the touchscreen display to display information pertaining to the repositioning of the repositionable virtual input button to the touchscreen display. For example, the CPU can cause the touchscreen display to display a message indicating that the virtual input is to be moved, can display a location to where the virtual input button is to be repositioned, or can display an acceptable position to which the virtual input button may be manually repositioned by a user. Thereafter, once the virtual input button has been repositioned, at step 240 the input attempt counter corresponding to the new position of the virtual input button may be reset to zero where such position has not been previously occupied by a virtual input button, and the processes redirected to step 100. Alternatively, at step 240, in the case where such new position may have been previously occupied by a virtual input button, but there is remaining useful lifespan available at such position, the input attempts counter may be reset according to the number of input attempts previously made at that position and saved to the one or more storages 15, and the processes redirected to step 100.

In the case that there are few, if any, available positions to which to reposition the virtual input button (Step 180: N), at step 230 the CPU maintains the current position the virtual input button and transmits a warning message to a central computer, or other device, indicating that the touchscreen display is nearing the end of its useful lifespan and/or may be in need of repair or replacement. Such message can include, for example, information pertaining to a percentage of available positions on the touchscreen that remain and/or a predicted remaining useful lifespan based on collected usage data.

Returning to step 120, in the case where that the number of attempted inputs does not exceed the preset threshold (Step 120: N), at step 130 the CPU then determines whether the input was successful. Where the input is successful (Step 130: Y), e.g., there is no or little measurable delay in the operation of a virtual input button, at step 140, the CPU increments a success counter, which success counter may be data pertaining to a current total number of successful inputs of the virtual input button made at its current position saved to the one or more storage devices 15. Thereafter, at step 160 the CPU then compares the current total of successful inputs with a preset threshold of successful inputs attempts, which may be saved in the one or more storages 15, to determine whether the total number of successful inputs is greater than the preset threshold.

Upon such comparison 160, in the case where the total number of input attempts exceeds the preset threshold of successful inputs (Step 160: Y), based on data and information previously obtained, at step 180 the CPU then determines whether a position on the touchscreen display is available for purposes of repositioning the virtual input button. Where the CPU determines that a position is available (Step 180: Y), at step 220 the CPU then causes the virtual input button to be automatically incremented according to any preexisting rules or instructions, for example, as previously described, or may allow the virtual input button to be manually repositioned to another location by a user, for example, as previously described. In the case of automatic or manual repositioning, the CPU can cause the touchscreen display to display information pertaining to the repositioning of the virtual input button to the touchscreen display. For example, the CPU can cause the touchscreen display to display a message indicating that the virtual input is to be moved, can display a location to where the virtual input button is to be repositioned, or can display an acceptable position to which the virtual input button may be manually repositioned by a user. Thereafter, once the virtual input button has been repositioned, at step 240 the input attempt counter corresponding to the new position of the virtual input button may be reset to zero where such position has not been previously occupied by a virtual input button, and the processes redirected to step 100. Alternatively, at step 240, in the case where such new position may have been previously occupied by a virtual input button, but there is remaining useful lifespan available at such position, the input attempts counter may be reset according to the number of input attempts previously made at that position and saved to the one or more storages 15, and the processes redirected to step 100.

Returning to Step 160, where the number of successful inputs exceed the preset threshold (Step 160: Y) and in the case that there are few, if any, available positions to which to reposition the virtual input button (Step 180: N), at step 230 the CPU maintains the current position the virtual input button and transmits a warning message to a central computer, or other device, indicating that the touchscreen display is nearing the end of its useful lifespan and/or may be in need of repair or replacement. Such message can include, for example, information pertaining to a percentage of available positions on the touchscreen that remain and/or a predicted remaining useful lifespan based on collected usage data.

Returning to Step 160, where the number of successful inputs does not exceed the preset threshold (Step 160: N), at step 190 the CPU may query a user to determine whether the current position of the virtual input button is acceptable. Where the user determines that the current position is acceptable (Step 190: Y), at step 210 the CPU maintains the current position of the virtual input button and the process is returned to step 100. Where the user determines that the position is not acceptable and the user would simply like to reposition the virtual input button as desired (Step 190: N), the user may be provided with option to manually reposition the virtual input button at steps 200, 220, and 240, and the process is returned to step 100. Where a user desires to manually reposition the virtual input button (Step 190: Y), but, for example, subsequently finds that the available positions are not desirable (Step 200: N), the CPU may maintain the current position of the virtual input button at step 210, and the process returned to step 100.

Returning now to step 130, where an input attempt is unsuccessful (Step 130: N), e.g., there are undesirable delays in the operation of a virtual input button, at step 150 the CPU increments a fail counter, which fail counter may be data pertaining to a current total number of failed inputs of the virtual input button made at its current position saved to the one or more storage devices 15. Thereafter, at step 170 the CPU then compares the current total of failed inputs with a preset threshold of failed inputs, which may be saved in the one or more storages 15, to determine whether the total number of failed inputs is greater than the preset threshold. At step 170, where the number of failed inputs exceed the preset threshold (Step 170: Y), the previously described processes 180, 220, 230, 240 and return to 100 are performed as appropriate. Where the number of failed input attempts does not exceed the preset threshold (STEP 170: N), the previously described processes 190, 200, 210, 220, 230, 240 and return to 100 are performed as appropriate.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A touchscreen display comprising:
a transparent coverscreen;
a conductive layer capable of communicating an electric signal; and
an electronic display displaying a virtual input;
wherein, the touchscreen display is in electric communication with a central processing unit (CPU) and a non-transitory computer readable storage medium that stores computer readable instructions for operating the touchscreen display, as well as data corresponding to the touchscreen display;
wherein, the virtual input is repositionable from a first display position on the touchscreen display to a second display position on the touchscreen display based on the virtual input at the first display position satisfying one or more of: a number of successful input attempts satisfying predetermined criteria, a number of failed input attempts satisfying predetermined criteria, and a ratio of a number of successful inputs attempts as compared to a number of failed inputs attempts; and,
wherein, the virtual input is manually repositionable from the first display position to the second display position, and when input of the virtual input is maintained for a predetermined period of time, one or more positions to which the virtual input may be repositioned to constitute the second display position are displayed, and one or more positions to which the virtual input may not be repositioned to constitute the second display position are displayed.

2. The touchscreen display of claim 1, wherein the one or more positions to which the virtual input may be repositioned are displayed in a first color and the one or more positions to which the virtual input may not be repositioned are displayed in a second color different from the first color.

3. The touchscreen display of claim 1, wherein the virtual input is repositionable from the first display position to an $n^{th}$ display position, which $n^{th}$ display position is dissimilar to a former display position of the virtual input.

4. A touchscreen display comprising:
a transparent coverscreen;
a conductive layer capable of communicating an electric signal; and
an electronic display displaying a virtual input;
wherein, the touchscreen display is in electric communication with a central processing unit (CPU) and a non-transitory computer readable storage medium that stores computer readable instructions for operating the touchscreen display, as well as data corresponding to the touchscreen display; and,
wherein, the virtual input is repositionable from a first display position on the touchscreen display to a second display position on the touchscreen display based on the virtual input at the first display position satisfying one or more of: a number of successful input attempts satisfying predetermined criteria, a number of failed input attempts satisfying predetermined criteria, and a ratio of a number of successful inputs attempts as compared to a number of failed inputs attempts; and
wherein, the virtual input is repositionable from the first display position to an $n^{th}$ display position, which $n^{th}$ position is dissimilar to a former display position of the virtual input, and wherein when is it determined that no further $n^{th}$ display positions are available to which to reposition the virtual input, a signal is transmitted by the CPU indicative of the determination.

5. The touchscreen display of claim 4, wherein the virtual input is incrementally repositionable from the first display position to the second display position within a predefined proportional distance.

6. The touchscreen display of claim 4, wherein the virtual input is incrementally repositionable from the first display position to the second display position such that the second display position partially overlaps with the first display position.

7. The touchscreen display of claim 4, wherein the virtual input is incrementally repositionable from the first display position to the second display position such that the virtual input is maintained within a predefined region of the touchscreen display.

8. The touchscreen display of claim 4, wherein the virtual input is successively incrementally repositionable from the first display position to an $n^{th}$ display position within a first predefined region of the touchscreen display, and when the virtual input satisfies predetermined criteria at the $n^{th}$ display position within the first predefined region, the virtual input is repositionable to a second predefined region of the touchscreen display.

9. The touchscreen display of claim 4, wherein the virtual input is automatically incrementally repositionable from the first display position to the second display position.

10. The touchscreen display of claim 4, wherein the virtual input is manually repositionable from the first display position to the second display position.

11. The touchscreen display of claim 4, wherein when the data satisfies predetermined criteria, an indicator is displayed on the touchscreen display to indicate that the virtual input is to be repositioned from the first display position to the second display position.

12. The touchscreen display of claim 11, wherein the indicator comprises at least one of a message output to the touchscreen display, a change in a shade of the virtual input, or a change in color of the virtual input.

13. The touchscreen display of claim 4, wherein when an input of the virtual input is maintained for a predetermined period of time, data pertaining to the virtual input at the current position is displayed to the touchscreen display.

14. The touchscreen display of claim 4, wherein the virtual input is repositionable from the first display position to the second display position based on one or more of: a preset time period, a time of day, a time of week, a time of month, a time of year, a temperature, and humidity.

15. The touchscreen display of claim 4, wherein a frequency of the repositioning of the virtual input from the first display position to the second display position is based on one or more of a time of day, a time of week, a time of month, a time of year, a temperature, and humidity.

16. The touchscreen display of claim 4, wherein the virtual input is repositionable from the first display position to the second display position based on the number of failed input attempts occurring within a predetermined time period.

17. A touchscreen display comprising:
a transparent coverscreen;
a conductive layer capable of communicating an electric signal; and
an electronic display displaying a virtual input;
wherein, the touchscreen display is in electric communication with a central processing unit (CPU) and a non-transitory computer readable storage medium that stores computer readable instructions for operating the touchscreen display, as well as data corresponding to the touchscreen display; and,
wherein, the virtual input is repositionable from a first display position on the touchscreen display to a second display position on the touchscreen display based on the virtual input at the first display position satisfying one or more of: a number of successful input attempts satisfying predetermined criteria, a number of failed input attempts satisfying predetermined criteria, and a ratio of a number of successful inputs attempts as compared to a number of failed inputs attempts;
wherein the virtual input is repositionable from the first display position to the second display position based on a measured change in a resting voltage, a resting capacitance, or a resting resistance of a portion of the conductive layer relative to a previously obtained resting voltage, resting capacitance, or resting resistance of the portion of the conductive layer; and,
wherein when the measured change in the resting voltage, the resting capacitance, or the resting resistance of the portion of the conductive layer satisfies predetermined criteria and is indicative of degradation of the portion of the conductive layer associated with the first display position, the virtual input is repositionable from the first display position to the second display position, which second display position is not associated with the degraded portion of the conductive layer, or another degraded portion of the conductive layer.

18. A method of repositioning a virtual input on a touchscreen display from a first display position to a second display position, the touchscreen display in electronic communication with a central processing unit (CPU) and a non-transitory computer readable storage medium storing instructions for operating the touchscreen display, as well as storing data corresponding to the touchscreen display, the method comprising, with the CPU:
receiving data corresponding to an input attempt of the virtual input at the first display position;
determining whether the input attempt at the first display position was a successful input attempt or a failed input attempt;
storing a number of input attempts, a number of successful input attempts, and a number of failed input attempts of the virtual input at the first display position in the non-transitory computer readable storage medium; and,
determining whether one of the number of input attempts, the number of successful input attempts, and the number of failed input attempts of the virtual input at the first display position satisfy predetermined criteria;
wherein, when one of the number of input attempts, the number of successful input attempts, and the number of failed input attempts of the virtual input at the first display position do not satisfy the predetermined criteria, allowing the virtual input to maintain a display position at the first display position; and,
wherein, when one of the number of input attempts, the number of successful input attempts, and the number of failed input attempts of the virtual input at the first display position satisfy the predetermined criteria, allowing the virtual input to be repositioned to the second display position different from the first position.

19. The method of claim 18, wherein repositioning of the virtual input from the first display position to the second display position is performed automatically by the CPU, or the CPU allows the repositioning to be performed manually.

20. The method of claim 19, wherein when the virtual input is automatically repositioned, it is incrementally repositioned from the first display position to the second display position such that the second display position partially overlaps the first display position.

21. The method of claim 19, wherein when the virtual input is manually repositioned, the CPU
displays to the touchscreen one or more positions to which the virtual input may be repositioned to constitute the second display position in a first color and one or more positions to which the virtual input may not be repositioned to constitute the second display position in a second color different from the first color.

22. The method of claim 19, wherein when the virtual input is automatically repositioned, it is successively incrementally repositionable from the first display position to an $n^{th}$ display position within a first predefined region of the touchscreen display, and when the virtual input satisfies predetermined criteria at the $n^{th}$ display position within the first predefined region, the virtual input is repositionable to a second predefined region of the touchscreen display.

23. The method of claim 18, wherein when input of the virtual input is maintained for a predetermined time period, data corresponding to the current display position of the virtual input is displayed.

24. The method of claim 18, wherein the CPU is configured to receive electronic signals from an electrically conductive layer of the touchscreen display corresponding to one or more of a resting voltage, a resting capacitance, or a resting resistance of the conductive layer; and wherein, when a change in the resting voltage, the resting capacitance, or the resting resistance of a portion of the conductive layer corresponding to the first display position of the virtual input, relative to a previously obtained resting voltage, resting capacitance, or resting resistance of the portion of the conductive layer corresponding to the first display position of the virtual input satisfies predetermined criteria, repositioning the virtual input from the first position to the second position.

* * * * *